United States Patent [19]

Rhodes

[11] 4,319,173
[45] Mar. 9, 1982

[54] DUAL POLARITY FAST DISCHARGE INTEGRATOR APPARATUS

[75] Inventor: Melvin H. Rhodes, Cedar Rapids, Iowa

[73] Assignee: Rockwell International Corporation, El Segundo, Calif.

[21] Appl. No.: 158,848

[22] Filed: Jun. 12, 1980

[51] Int. Cl.$^3$ .............................................. G05B 11/36
[52] U.S. Cl. .................................................. 318/609
[58] Field of Search ................ 318/609, 610, 621, 622

[56] References Cited

U.S. PATENT DOCUMENTS 3,696,282 10/1972 Hirokawa et al. .................. 318/610
4,008,386 2/1977 Ross ..................................... 318/610

Primary Examiner—J. V. Truhe
Assistant Examiner—Eugene S. Indyk
Attorney, Agent, or Firm—Bruce C. Lutz; Howard R. Greenberg; H. Fredrick Hamann

[57] ABSTRACT

An integrator is illustrated which provides normal action integration operation as long as the input signals remain a given polarity. However, when the input signal changes in polarity, the integrating capacitor is substantially instantly discharged and then the integrator integrates, from the discharged capacitor condition, in the changed polarity direction until the input signal polarity again changes.

4 Claims, 2 Drawing Figures

DUAL POLARITY FAST DISCHARGE INTEGRATOR APPARATUS

THE INVENTION

The present invention is generally concerned with electronics and more specifically concerned with integrating apparatus. Even more specifically, the present invention finds application in a compensating loop of a motor control system wherein compensation forces are required.

The prior art has contained fast discharge slow charge integrators but as far as is known by the present applicant, these integrators were all single polarity. In other words, the integrator reduced to zero when the polarity changed but there was no integration in the opposite direction.

The present invention utilizes a limiter amplifier circuit connected in parallel with an integrating capacitor that has a limit value proportional to the input signal up to a value as limited by limiter amplifier saturation. This proportionality can be changed by the gain of the limiter amplifier. When the input goes to zero the limit across the integrating capacitor will quickly go to zero which will return the integrator to zero.

It is therefore an object of the present invention to provide apparatus for providing not only substantially normal integration operation in either direction from zero (discharge) once a condition has been established but in addition, provide fast discharge in the event that the input signal changes polarity so that the new situation can be accommodated.

Other objects and advantages of the present invention will be apparent from a reading of the specification and appended claims in conjunction with the drawings wherein:

DETAILED DESCRIPTION

Figure 1:
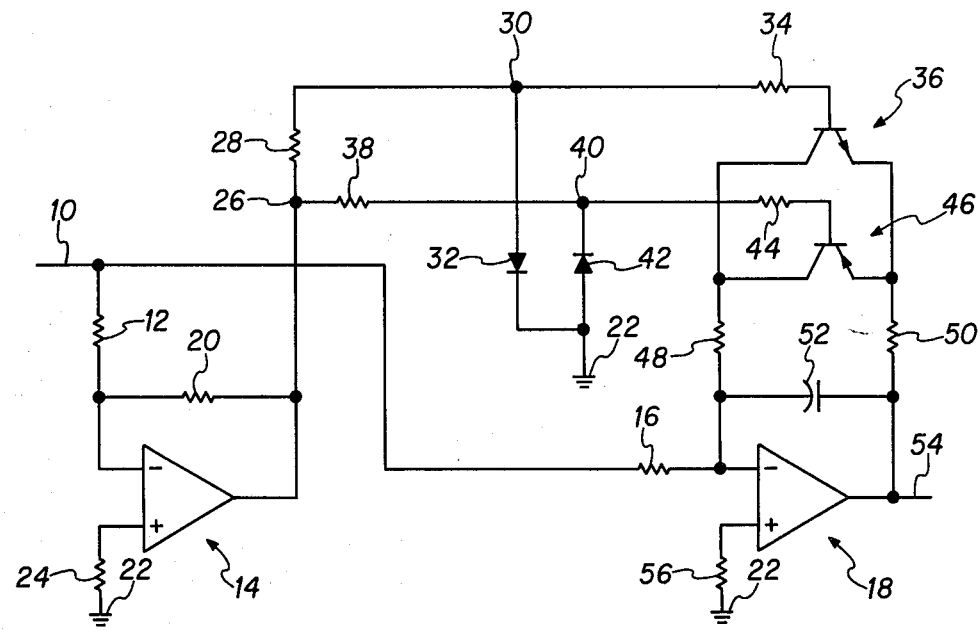
FIG. 1 is a schematic diagram of one embodiment of the inventive concept.

A lead 10 in FIG. 1 supplies input signals through a resistor 12 to an inverting input of an operational amplifier generally designated as 14 and also through a resistor 16 to an inverting input of an operational amplifier generally designated as 18. The amplifier 14 has a feedback resistor 20 and has its noninverting input connected to ground 22 through a resistor 24. An output of amplifier 14 is connected to a junction point 26 which is then further connected through a resistor 28 to a junction point 30. Junction point 30 is connected through a diode, voltage limiting means or rectifying means 32 to ground 22 and also connected through a resistor 34 to a base of an NPN transistor or switch generally designated as 36. A resistor 38 is connected between junction point 26 and a junction point 40. A diode or rectifying means or voltage limiting means 42 is connected between junction point 40 and ground 22. A resistor 44 is connected between junction point 40 and a base of a PNP transistor or switch generally designated as 46. The collectors of transistors 36 and 46 are connected together and connected through a resistor 48 to the negative input of amplifier 18. The emitters of transistors 36 and 46 are connected together and connected through a resistor 50 to the output of amplifier 18. An integrating or feedback capacitor 52 is connected from output to input of amplifier 18. The output of amplifier 18 is connected to an output terminal 54 for supplying integrated output signals. A resistor 56 is connected between ground 22 and the noninverting input of amplifier 18.

Figure 2:
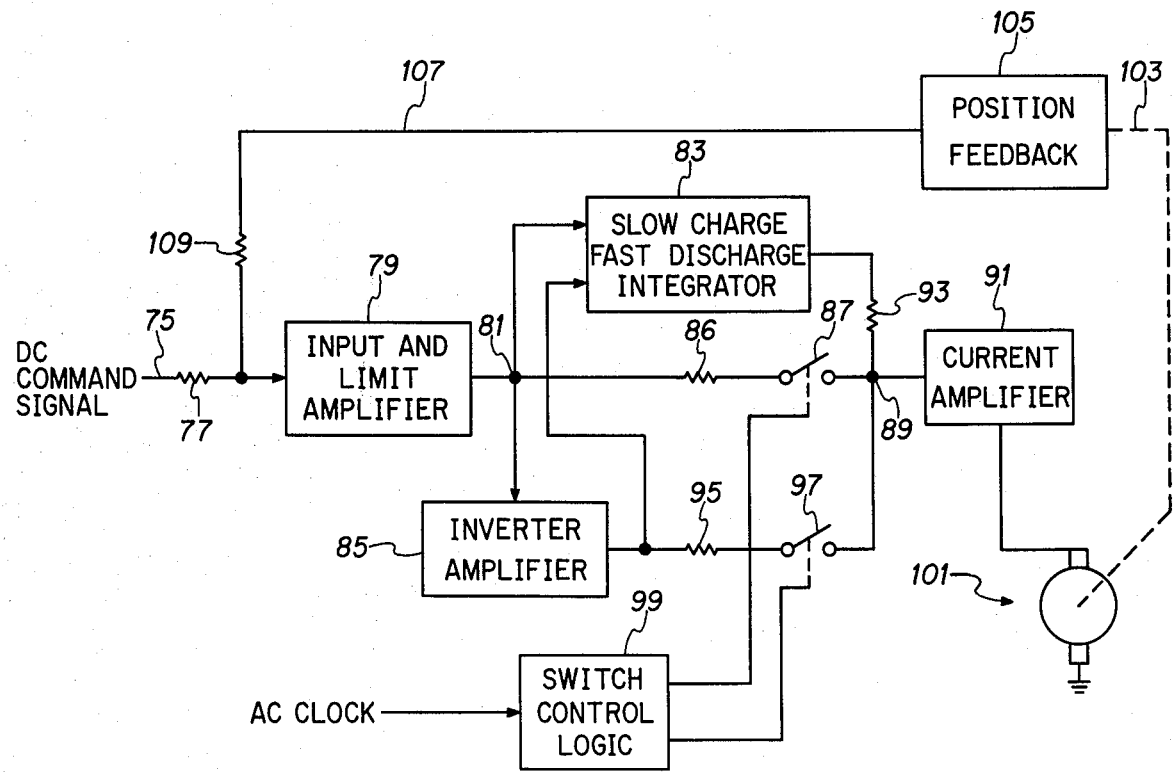
FIG. 2 is a block diagram of a motor control system incorporating the inventive concept.

In FIG. 2 a DC command signal is supplied to an input terminal 75 and passes through a resistor 77 to an input and limit amplifier 79. The input and limit amplifier 79 supplies signals to a junction point 81 corresponding generally to lead 10 of FIG. 1. As shown, signals at junction point 81 are applied to a slow charge fast discharge integrator 83 and to an inverter amplifier 85. Inverter amplifier 85 corresponds generally to amplifier 14 of FIG. 1 and the remaining circuitry of FIG. 1 comprises the contents of block 83. Junction point 81 is also connected through a resistor 86 and a switch 87 to a junction point 89 which comprises an input to a current amplifier 91. A resistor 93 connects the output of integrator 83 to junction point 89. An output of inverter amplifier 85 supplies further input signals to integrator 83 and also supplies these signals through a resistor 95 and a switch 97 to junction point 89. An AC clock signal is input to a switch control logic block 99 which operates the switches 87 and 97. The current amplifier 91 is connected to supply control signals to a motor generally designated as 101 which has a mechanical output 103 controlling a position feedback block 105. Position feedback block 105 provides an electrical signal output indicative of the position of mechanical input on 103 to a lead 107 which is connected through a resistor 109 to the input of amplifier 79.

OPERATION

It may be assumed in describing the operation of the circuit that a positive input signal is applied on lead 10. This input signal will be inverted in amplifier 18 and provides a negative output signal which will charge the capacitor 52 such that relatively the righthand portion is negative and the lefthand portion is positive. This positive input signal on 10 is inverted in amplifier 14 so that a negative signal is applied to junctions 30 and 40. The negative signal at junction 40 will be limited by diode 42 and thus will activate switch 46. The negative signal at junction 30 is of the wrong polarity type to activate switch 36 unless the integration operation took place over an extremely long period of time and lead 54 became more negative than junction point 30. However, the switch would merely prevent further charging in this situation.

In view of the above, the integration in capacitor 52 in combination with integrating amplifier 18 occurs in normal fashion. However, if the input signal (which had been previously plus polarity) now changes to a minus polarity, the output of amplifier 14 and accordingly junction points 30 and 40 will substantially instantaneously be positive. However, the output of amplifier 18 cannot immediately change to positive due to the storage of a charge in capacitor 52. Thus, the output terminal 54 remains negative momentarily. The positive signal at junction point 30 will activate switch 36 which through resistors 48 and 50 will discharge capacitor 52 in a very short period of time. As soon as capacitor 52 is discharged, transistor 36 again turns OFF and the integration can proceed as normal. When the polarity at input 10 again changes to positive, switch 46 is activated on the same basis and it returns to the originally assumed conditions.

The circuit of FIG. 1 will act as a normal integrator as long as the limit set by amplifier 14 is not reached. In other words, for a given input, the output of amplifier 14 will set the limit beyond which the integrating capacitor cannot charge. Further, if the integrator reaches the limit as determined by the input applied to terminal 10 and the gain of amplifier 14, and the input is then reduced, one of the switches 36 or 46 will discharge capacitor 52 to the new and lower limit. In this respect, the limiting action differentiates this integrator from normal integrating circuits. p As will be realized by those skilled in the art, various types of DC motors have drag and other spring tension torques which prevent the motor from reaching a desired position with a given magnitude and duration input signal. In such situations, an integrator may be used to build up a signal which will overcome the spring torque and move the motor to its desired location. This integrated signal is summed with the input signal to produce a composite which is used to drive the motor. The motor circuit of FIG. 2 uses a DC level input on lead 75 which is limited in amplitude by amplifier 79. The polarity of the dual signal pulses applied to the motor is determined by one of the switches 87 or 97. These dual pulses are used to operate motor 101 after passing through current amplifier 91.

The theory relative this block diagram configuration is expanded upon in great detail in my co-pending application Ser. No. 181,298, filed concurrently herewith and assigned to the same assignee as the present invention. However, the basis of FIG. 2 is that an input signal is used to generate a pulse pair wherein each pulse of the pair is opposite in polarity. The first pulse of the pair is used to accelerate the motor and the second pulse is used to decelerate the motor such that it stops a given rotational distance away from its starting point. The polarity of the first pulse determines direction of rotation.

The problem with this apparently simple approach to implementing a circuit to accomplish same lies in spring torques, magnetic detents and other position modifying torques which prevent accurate positional rotation.

If the spring torques were constant, a bias could be built in, however, the spring torques are dependent not only upon brush springs but, in addition, are variable depending upon the position of the motor, the amount of wear and the field strength at different winding positions. Further, the springs used to hold the brushes in place often have a given torque in one direction and a different torque when the motor is attempting to rotate in the opposite direction. Thus, the integrator 83 operates to overcome these various residual or limiting torques and accumulate the input signal until the accumulated signal is large enough to operate the motor.

Although a single embodiment has been illustrated to practice the invention, I wish to be limited not by just the concept illustrated but only by the scope of the appended claims wherein I claim:

1. Integration apparatus comprising, in combination:
   integrating means including a single amplifier and feedback capacitor, said integrating means providing bipolar output signals in response to the polarity of input signals supplied thereto;
   polarity sensitive switch means, including signal input means, connected to said feedback capacitor means for discharging same under predetermined conditions; and
   signal means for supplying bipolar input signals to be integrated to said amplifier means of said integrating means and to said input means of said switch means, said switch means providing a low impedance discharge path to said feedback capacitor means when the polarity of the signal supplied by said signal means and a signal output by said integrating means have predetermined relative polarity values.

2. The method of providing dual polarity slow integration and fast discharge comprising the steps of:
   integrating a bipolar input signal with a single amplifier and capacitor to provide a bioplar integrated value output signal;
   detecting the relative polarity of input and integrated output signals; and
   quickly discharging the integrating apparatus when the detected signals reach predetermined relationships.

3. Quick discharge integrating apparatus comprising, in combination:
   bipolar integration means including a single feedback capacitor;
   signal input means for supplying bipolar signals to said integration means to be integrated to said integration means; and
   detection means, connected to said signal input means and said integration means, for quickly discharging said capacitor means upon detection of change in polarity of signals at said signal input means.

4. Servo system apparatus comprising, in combination:
   signal input means for supplying dual polarity control signals;
   summing means, including a first input for receiving signals from said signal input means, a second input and output means;
   motor means;
   amplifier means, connected between said output means of said summing means and said motor means, for supplying motor drive signals thereto;
   dual polarity input and output signals, slow charge, fast discharge integrator means including a single amplifier and capacitor, connected to said amplifier means, for supplying supplementary signals to said motor means; and
   position feedback means, connected between said motor means and said second input of said summing means, for supplying position indicative signals thereto.

* * * * *